Figure 1:
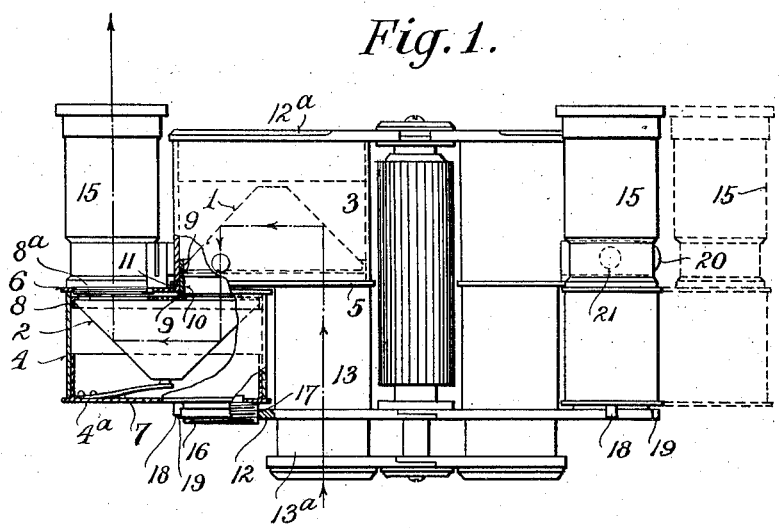

J. H. BARTON.
PRISMATIC TELESCOPE, THEATER AND FIELD GLASS.
APPLICATION FILED MAR. 14, 1911.

1,016,315.

Patented Feb. 6, 1912.

WITNESSES:

INVENTOR:
John Henry Barton,
By his Attorneys
Fraser, Trask & Myers

UNITED STATES PATENT OFFICE.

JOHN HENRY BARTON, OF LONDON, ENGLAND.

PRISMATIC TELESCOPE, THEATER AND FIELD GLASS.

1,016,315.  Specification of Letters Patent.  Patented Feb. 6, 1912.

Application filed March 14, 1911. Serial No. 614,384.

*To all whom it may concern:*

Be it known that I, JOHN HENRY BARTON, of 19 Honeywell road, Wandsworth Common, London, England, have invented certain new and useful Improvements in Prismatic Telescopes, Theater and Field Glasses, of which the following is a specification.

This invention relates to prismatic telescopes and prismatic theater and field glasses comprising an erecting system consisting of two right angle prisms disposed between the eyepiece and the objective and set in planes at right angles with each other.

The object of the invention is to construct the same in such a manner that their thickness can be reduced to an extent which enables them to be readily carried in an ordinary coat pocket, whereas with the ordinary method of construction the thickness is such that a case to contain the instrument is practically a necessity.

The ordinary method of construction is to fix the two right angle prisms rigidly at right angles with each other. This method necessarily entails that the space occupied by the prisms is considerably greater than the thickness of either one of the prisms.

By means of this invention when the instrument is not in use the prisms can be made to occupy a space only slightly greater than the thickness of one of them, so that the instrument can be made to assume a flat form very convenient for carrying in the pocket.

Attempts have been made to construct prism field glasses and the like of this kind in a portable form, but these have mainly consisted in reducing the size of the prisms, and this necessitates a corresponding reduction in the size of the eyepieces, with a consequent loss of both "field" and "light." With the present invention, however, large prisms and correspondingly large eyepieces can be used at the same time securing the maximum portability.

According to the invention the two right angle prisms between the objective and the eyepiece are disposed in separate cases rotatably connected together so that one of them can be turned at an angle of 90° relatively to the other into position at right angles thereto for use, and out of this position.

In carrying out my said invention I mount each prism in a separate metal case, the said case consisting of the case proper and a cover for closing the open end, and being just of sufficient width conveniently to take the prism and allow of its adjustment. The cases have apertures cut in their ends to allow of the passage of the image rays. Two of the said cases, together with an objective and eyepiece, form a complete prismatic telescope. The said two cases are connected together by a joint which may be formed on or in the apertures cut in their ends as aforesaid, and they are kept in position by suitable means such as metal bars of approximately the same width as the prism cases themselves. One of the cases is rigidly fixed to one of the bars, but the other case is free to revolve through an arc of 90° on the joint aforesaid. It will be seen that the two prisms thus mounted may either be placed in one and the same plane or can be set at right angles with each other. On one of the said cases is affixed a tube for the purpose of carrying the objective, and on the other case a similar tube to carry the eyepiece. These tubes for carrying the objective and eyepiece respectively are mounted over the corresponding apertures in the ends of the cases. Suitable means should be provided for limiting the two end positions of the prisms.

Two of such prismatic telescopes as thus described may be mounted together to form a theater or field glass. This may be accomplished by means of the bars aforesaid which keep the cases in position. For this purpose the said bars may be extended and fitted together rigidly, or they may have a lateral sliding motion in order to allow for difference in pupillary distance, but preferably they have joints formed on them in order that the pupillary distance may be varied by a simple bending of the instrument. A suitable simultaneous focusing mechanism can be fitted between the said joints, or the instrument may be focused separately or independently. The focusing may be effected either by moving the eyepiece or the objective.

The annexed drawings illustrate by way of example a binocular prismatic theater or field glass constructed in accordance with the invention.

Figure 2:
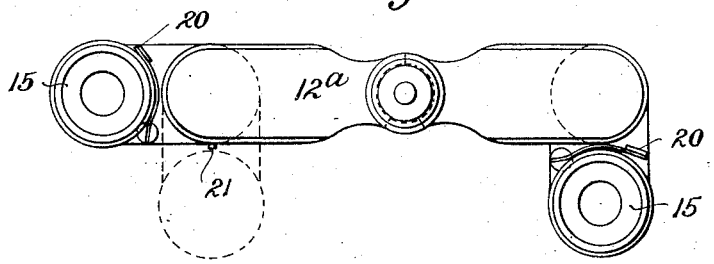

Figure 1 is an elevation of the instrument partly in section, Fig. 2 is a plan.

For convenience the construction will be described with reference to one side of the instrument, the other side being the counterpart. Each of the prisms 1, 2 is mounted in a separate metal case 3, 4 each of just sufficient width to take the prism conveniently and allow of its adjustment.

5, 6 are the closed ends of the cases, 4ᵃ is the cover to the open end of the lower case 4, and 12ᵃ is the cover for the open end of the top case 3. When the instrument is constructed as a binocular the top cover 12ᵃ is made with an extension to form one half of the central joint.

The prisms are held in position in their cases by springs such as 7, and their horizontal faces are seated in loose shoes such as 8, formed with openings 8ᵃ for the passage of the image rays. They can be adjusted in any known or suitable way.

The cases 3, 4 have apertures 9, 9 cut in their closed ends for the passage of the image rays and are connected together by a joint formed by a shallow spigot 10 of the aperture 9 in case 3 engaged in the aperture 9 of case 4 and seated on the shoulder formed by the periphery of the aperture of case 4, a loose ring 11 being fitted on the spigot between the adjacent faces of the two cases. Any other suitable form of joint may be provided. The cases 3 and 4 are kept in position by reason of the metal bar 12 (of approximately the same width as the prism case) being rigidly attached to the tube 13, which is itself rigidly attached to one of the apertures cut in the ends of case 3. The prism case 3 is thus rigid with the bar 12 but the case 4 is free to revolve through an arc of 90° on the joint. A tube 13ᵃ, carrying the objective, slides in the tubes 13 for the purpose of focusing, and a tube 15 carrying the eyepiece is screwed into the case 4, the apertures in the cases for these tubes register with the corresponding apertures 8ᵃ in the shoes 8. A ferrule 16 is screwed into a threaded hole 17 in the bar 12 and tightened up to clamp the case 4 rotatably in position. It will thus be seen that the two prism cases can thus be turned into one and the same plane so as to lie flat, or they can be turned into a position at right angles to each other for use.

18 is a stop pin abutting against a shoulder 19 on the bar 12 and serving to limit the flat position, and 20 is a flat spring formed with a hole to engage a projection 21 on the case 3, in order to retain the prism cases in the right angle position; by pressing on the spring it can be released for turning the prism cases.

The bars 12, 12ᵃ of the two counterpart arrangements of the binocular instrument are shown as pivoted together in the known way so that they can be turned on the central axis to adjust the pupillary distance.

In the drawings the prism cases on the left are shown in the flat position and those on the right in the right angle position.

The instrument is also shown as provided with an ordinary simultaneous focusing motion.

It will be understood that for single telescopes a single pair of prism cases mounted in the manner described will be employed.

What I claim and desire to secure by Letters Patent is:—

1. Prismatic telescopes, theater or field glasses, comprising in combination an objective and an eyepiece, and an erecting system comprising a pair of right angle prisms, each of which is arranged to produce a double reflection of a beam of light, said prisms being pivotally mounted with respect to one another along an axis coincident with the path of a beam of light from one prism to the other.

2. Prismatic telescopes, theater or field glasses, comprising in combination an objective and an eyepiece, and an erecting system comprising a pair of right angle prisms, each of which is arranged to produce a double reflection of a beam of light, a casing for each of said prisms, said casings being pivotally mounted with respect to one another along an axis coincident with the path of a beam of light from one prism to the other, and said eyepiece being mounted upon one of said casings and said objective upon the other.

3. Prismatic telescopes, theater or field glasses, comprising in combination a pair of objectives and a pair of eyepieces, and a pair of erecting systems each comprising a pair of right angle prisms, each prism of each erecting system being arranged to produce a double reflection of a beam of light, one of said objectives, eyepieces, and erecting systems being adjustable laterally with respect to the other.

4. Prismatic telescopes, theater or field glasses, comprising in combination a pair of objectives and a pair of eyepieces, and a pair of erecting systems each comprising a pair of right angle prisms, each prism of each erecting system being arranged to produce a double reflection of a beam of light, said prisms of each system being pivotally mounted with respect to one another along an axis coincident with the path of a beam of light from one prism to the other, one of said objectives, eyepieces, and erecting systems being adjustable laterally with respect to the other.

5. Prismatic telescopes, theater or field glasses, comprising in combination an objective and an eyepiece, an erecting system consisting of two right angle prisms each of which is arranged to produce a double reflection of a beam of light, disposed between said objective and eyepiece, and separate cases rotatably connected together and wherein said prisms are respectively mounted whereby the prisms can be turned into position at right angles to each other for use and out of this position for carriage, substantially as described.

6. Prismatic telescopes, theater or field glasses, comprising in combination an objective and an eyepiece, an erecting system consisting of two right angle prisms each of which is arranged to produce a double reflection of a beam of light, disposed between said objective and eyepiece, separate cases wherein said prisms are respectively mounted, apertures in said cases for the passage of the image rays and a rotatable joint between said cases, whereby said prism cases can be turned into position at right angles for use and into position parallel to each other, substantially as described.

7. Prismatic telescopes, theater or field glasses, comprising in combination an objective and an eyepiece, an erecting system consisting of two right angle prisms each of which is arranged to produce a double reflection of a beam of light, disposed between said objective and eyepiece, separate cases wherein said prisms are respectively mounted, said cases being rotatably connected together, whereby the prisms can be turned through a right angle in relation to each other, and means for securing the said cases in position at right angles to each other for use, substantially as described.

8. Prismatic telescopes, theater or field glasses comprising in combination an objective and an eyepiece, an erecting system consisting of two right angle prisms each of which is arranged to produce a double reflection of a beam of light, disposed between said objective and eyepiece, separate cases wherein said prisms are respectively mounted, said cases being rotatably connected together, whereby the prisms can be turned through a right angle in relation to each other, a spring catch for securing said cases in position at right angles to each other for use, and a stop for arresting the turning motion of the cases at the parallel position of the prisms, substantially as described.

9. A binocular telescope, theater or field glass, consisting of two elements, each comprising an objective and an eyepiece, an erecting system consisting of two right angle prisms each of which is arranged to produce a double reflection of a beam of light, disposed between said objective and eyepiece, separate cases wherein said prisms are respectively mounted and which are rotatably connected together and adapted to be turned axially into position at right angles for use and into position parallel to each other, means for securing said two elements together and means for adjusting the pupillary distance, substantially as described.

10. A binocular telescope, theater or field glass, consisting of two elements, each comprising an objective and an eyepiece, an erecting system consisting of two right angle prisms each of which is arranged to produce a double reflection of a beam of light, disposed between said objective and eyepiece, separate cases wherein said prisms are respectively mounted and which are rotatably connected together and adapted to be turned axially into position at right angles for use and into position parallel to each other, an axial pivot to which said two elements are connected and about which the same are rotatable for adjusting the pupillary distance, substantially as described.

11. Prismatic telescopes, theater or field glasses, comprising in combination an objective and an eyepiece, an erecting system consisting of two right angle prisms each of which is arranged to produce a double reflection of a beam of light, disposed between said objective and eyepiece, separate cases wherein said prisms are respectively mounted, a tube carrying said eyepiece and fixed to one of the cases and a tube carrying said objective and fixed to the other case, and a rotatable joint between said cases whereby the prisms can be turned into position at right angles to each other for use and out of this position for carriage.

12. Binocular telescopes, theater or field glasses, comprising objectives and eyepieces, said objectives being at a smaller distance apart than said eyepieces, in combination with erecting systems disposed between the respective objectives and eyepieces and each comprising two simple right angle prisms each of which is arranged to produce a double reflection of a beam of light, separate cases wherein the right angle prisms of each erecting system are respectively mounted and which are rotatably connected together and adapted to be turned axially into position at right angles for use and into position parallel to each other, substantially as described.

In witness whereof, I have hereunto signed my name in the presence of two subscribing witnesses.

JOHN HENRY BARTON.

Witnesses:
GEORGE BELOE ELLIS,
ROBERT MILTON SPEARPOINT.